United States Patent Office 3,515,614
Patented June 2, 1970

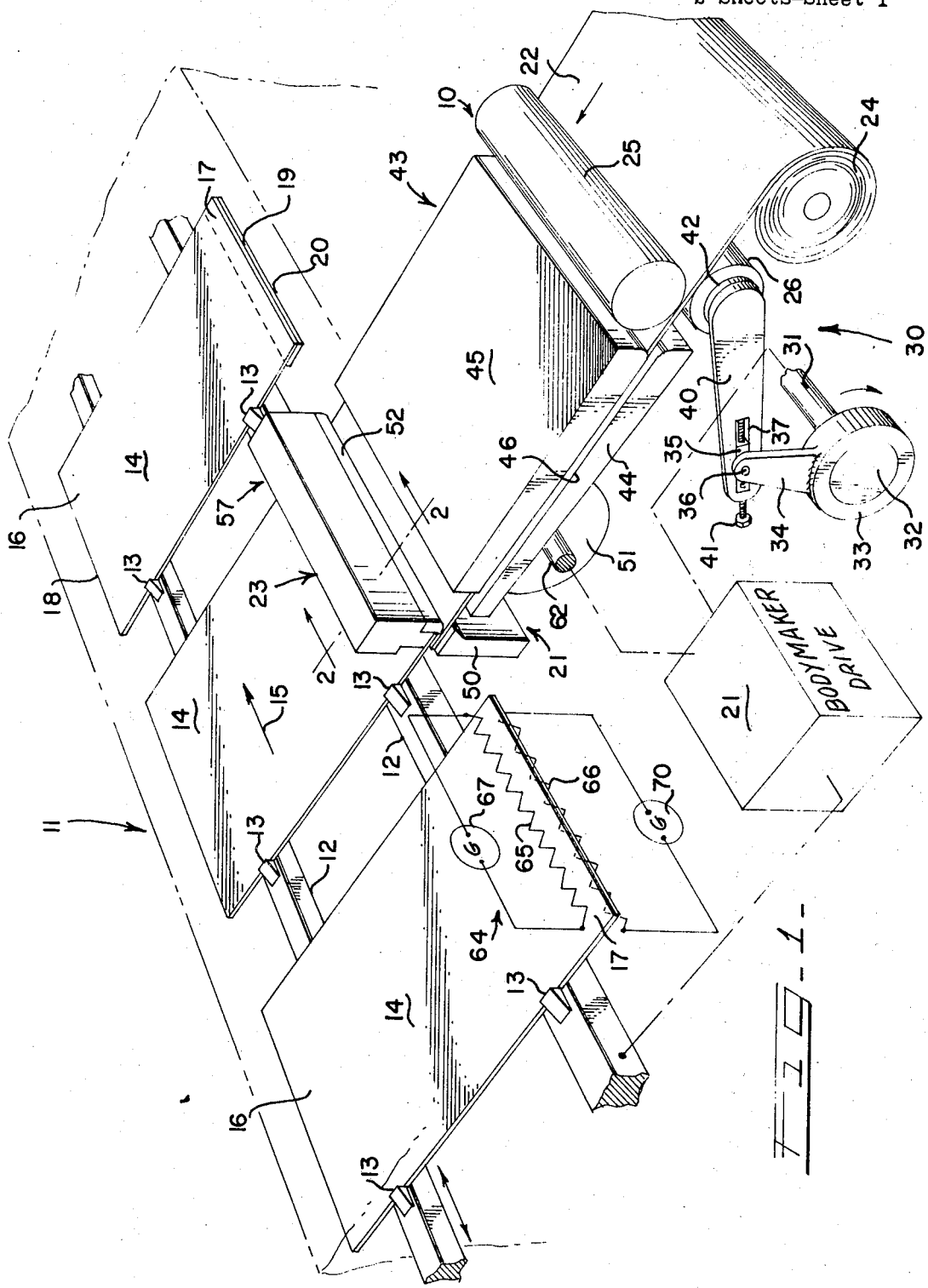

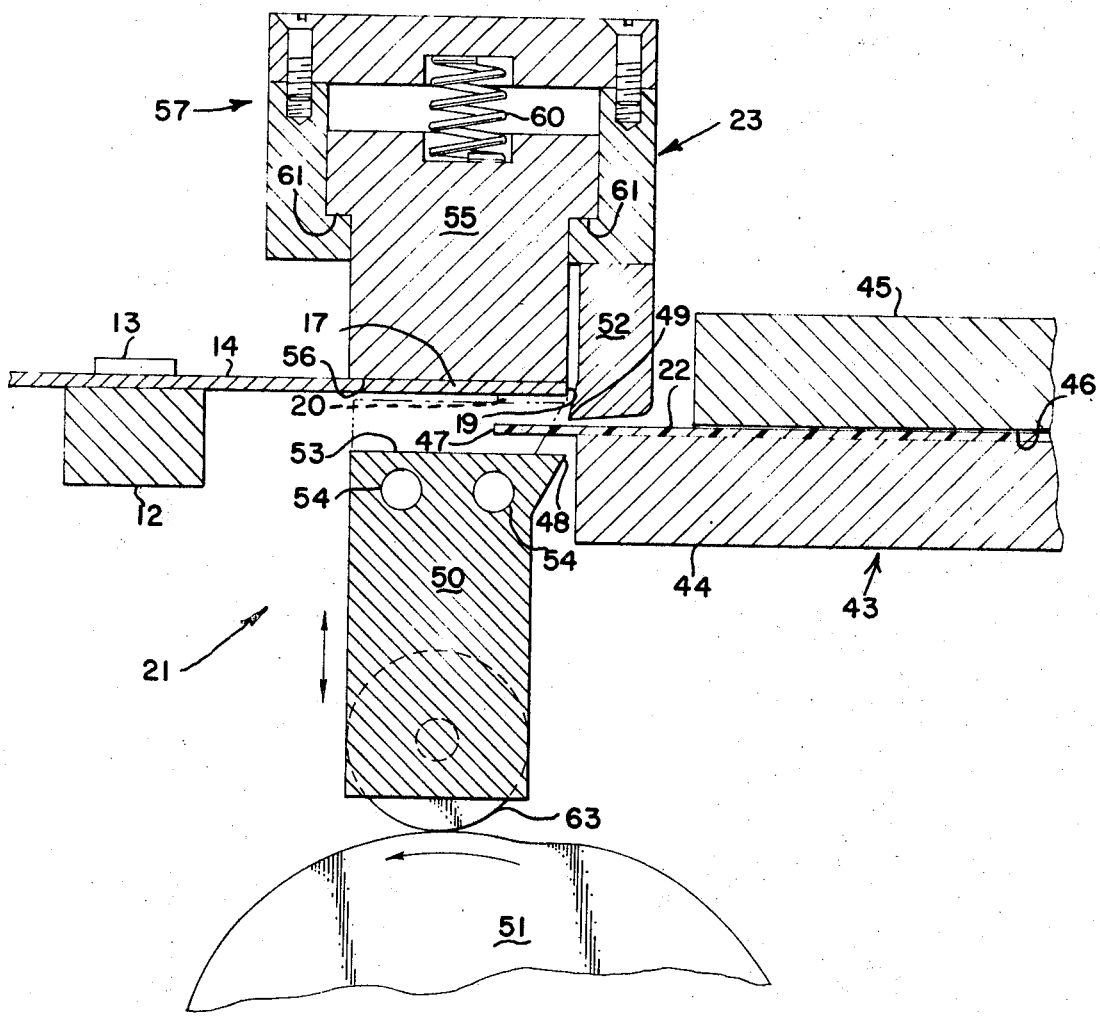

3,515,614
METHOD FOR APPLYING ADHESIVE STRIPS TO CAN BODY BLANKS
Robert W. Wolfe, Oak Lawn, Ill., assignor to Continental Can Company, Inc., New York, N.Y., a corporation of New York
Filed July 31, 1967, Ser. No. 657,407
Int. Cl. B32b 31/10, 31/18, 31/20
U.S. Cl. 156—265                                    13 Claims

ABSTRACT OF THE DISCLOSURE

A method for applying a strip of thermoplastic adhesive along a marginal edge portion of body blanks for solderless cans.

The method comprises intermittently advancing a series of blanks in single file along a path toward a strip applying station. Heating the marginal edge portion of each advancing blank that is to have a strip of adhesive applied thereto. Intermittently advancing a terminal end of thermoplastic strip forming material of a width as long as the blank edge into the strip applying station so that the end portion of the strip forming material is in lapped juxtaposition with the edge portion of a blank temporarily stationarily positioned at the strip applying station. The entire end portion of strip forming material lapping the blank edge portion is then sheared off and the sheared off strip is pressed into adhering engagement with the heated blank edge portion after which the blank is moved out of the strip applying station and the next blank is moved in.

BACKGROUND OF THE INVENTION

Field of the invention

The invention is broadly in the field of manufacturing bodies for containers such as cans. Specifically it relates to an improved method of and apparatus for applying a strip of thermoplastic adhesive material along a terminal side-seam forming edge of can body blanks subsequently to be formed into can bodies of the lap-seam type. The invention may be employed as an addition to a standard type of can body making machine or alternatively as a complete machine in itself as desired.

Description of the prior art

Insofar as is known, the best prior art practice for the application of thermoplastic adhesive forming tape to can body side-seam forming marginal edge portions involved supplying adhesive strip material from a large diameter very narrow roll of a width substantially the same as the width of overlap of the lap-seam of the can bodies subsequently formed. The tape was fed approximately halfway around the perimeter of a rubber surfaced pressure applying roll and through the nip formed between the pressure applying roll and a steel back-up roll positioned directly below the pressure applying roll.

Can body blanks were fed intermittently between the rolls by means of the usual feed bars and feed fingers of a can body making machine. Prior to delivering the blanks between the rolls, the marginal edge portion thereof to have the tape applied thereto was heated to render the thermoplastic adhesive strip material tacky so that it would adhere thereto.

The pressure applying and back-up rolls, which were constantly driven, were located in the path of travel of the blanks at a point where the blank marginal edge portion to have the tape applied thereto would pass between the rolls. As the blanks passed between the rolls the strip material from the supply roll was drawn around the pressure roll and was progressively pressed firmly against and adhered to the successively fed blanks. Due to the leading and trailing edges of the body blanks being sharp, and also due to the considerable pressure applied to the tape by means of the rubber coated pressure applying roll the tape was severed at the leading and trailing edges of the blanks.

Since, in the usual body maker, there is a space existing between the blanks as they are advanced by the feed bars, a portion of tape was fed by the tape delivery and pressure applying roll onto the steel back-up roll during the intervals between the passage of blanks through the tape applying station. This wasted portion of the tape was scraped from the back-up roll by means of a scraper positioned against the back-up roll.

This prior art proposal had several disadvantages that are overcome by the present invention. One disadvantage was that the adhesive tape was supplied in narrow strip form from a relatively large diameter roll. Such narrow strip material was relatively difficult to handle and accurately roll onto the can body blanks progressively from the leading edge to the trailing edge thereof without the formation of wrinkles in the applied strip or wavering of the strip. The wasting of the strip material between adjacently advancing blanks was also objectionable. Finally, although the rolls of relatively narrow strip material were of large diameter, the number of container body blanks that could be coated with tape from a single roll could have advantageously been much greater so as to obtain longer production runs between roll changes.

In accordance with the present invention, the roll of strip forming material is of a width substantially as long as the side-seam forming terminal blank edge. The wide width of strip forming material is severed transversely into narrow strips of a width substantially the same as the width of overlap of the container side-seam. Such a wide roll of strip forming material will contain many more times the amount of strip forming material for any convenient roll diameter as compared to the amount of strip forming material contained in a roll of equal diameter but of narrow width approximately the overlap width dimension of the container side-seam. The greater width roll, of course, will as a consequence, last many times longer and will not have to be changed nearly as frequently as the narrow roll.

Further, in accordance with the invention, the strip material is not rolled onto the blanks progressively from the leading to the trailing edge thereof while the blank is moving, but, instead, is applied while the blank is stationarily positioned at a strip applying station. The strip to be applied is positioned closely adjacent to and parallel with the surface of the blank to which it is to be attached and is then moved into contact with the blank by movement of the strip normal to the plane of the blank so that all portions of the strip surface that contacts the blank are substantially simultaneously resiliently pressed against the blank. By thus applying the strip material to the blank while the blank is stationary, the possibility of the strip material being applied in a wrinkled condition or not in proper alignment with the adjacent terminal or marginal blank edge is greatly minimized. Proper adherence of the strip material to the blank is also more reliably achieved due to the simultaneous pressing of all portions of the strip against the blank.

Still further, in accordance with the invention, none of the strip forming material is wasted between passage of the blanks. A strip forming material feeding device cyclically feeds a predetermined length of the strip forming roll-stock into a combination shearing and strip applying mechanism. The shear cyclically transversely severs the entire terminal end of the advance strip forming web and presses the sheared off strip against the blank temporarily stationarily positioned at the strip applying station into adhering engagement with the blank. By thus shearing off the entire terminal end portion of the strip forming web rather than blanking out strips from the web, so as to leave a waste skeleton of web material, there is substantially absolutely no wasting of the web material from which the adhesive strips are severed; the only waste being at the end of the roll of strip forming material which is negligible. Such a saving is very important when it is considered that many billions of cans are manufactured yearly.

SUMMARY OF THE INVENTION

To overcome the problems encountered in the above described best prior art practice known, the invention broadly provides a method which comprises advancing a series of blanks along a path toward a strip applying station, said blanks having a marginal edge portion that is to have a length of strip material applied thereto; advancing a terminal end of strip forming material of a width as long as the blank edge into the strip applying station so that the end portion of the strip material is in lapped juxtaposition with said marginal edge portion of a blank that has arrived at the strip applying station; transversely shearing off the entire end portion of strip material lapping the blank edge portion and pressing the shear off strip against said blank marginal edge portion to cause it to adhere thereto.

The apparatus of the invention broadly includes means for advancing blanks toward a strip applying station; strip shearing and applying means at the strip applying station effective to first transversely shear off an entire terminal end portion of strip forming material and to then press the sheared off strip into adhering engagement with a blank that has arrived at said station, and means for advancing the terminal end of strip forming material into the strip shearing and applying means in timed relationship with the movement of blanks into said station.

The apparatus as immediately above described may be employed as an improvement to a standard type of container body making machine which provides the means for advancing the blanks toward the strip applying station in single file step by step manner; said advancing means being the usual feed bars and feed fingers of the body maker.

The provision of the above described method and apparatuses represent the broad objects of the invention.

Other and more specific objects, advantages and uses of the invention will become apparent upon making reference to the drawings and following detailed description of a preferred embodiment.

BRIEF DESCRIPTION OF THE DRAWINGS

FIG. 1 is a perspective view, partly broken away, of a preferred form of apparatus in accordance with the invention associated with a conventional body maker, for carrying out the method of the invention and, FIG. 2 is an enlarged fragmentary sectional elevational view taken along line 2—2 of FIG. 1 and illustrating the details of the strip applying station.

DESCRIPTION OF THE PREFERRED EMBODIMENT

Referring to FIG. 1, of the drawings it will be seen that the strip applying apparatus of the invention generally indicated by the numeral 10 is associated with a can body making machine of conventional design, a portion of which is indicated in phantom outline and generally designated by the numeral 11.

The body maker 11 is of the type that includes a pair of horizontally disposed feed bars 12 that reciprocate in unison cyclically back and forth in the direction of their longitudinal axes. Each of the feed bars 12 includes a plurality of equally spaced apart feed fingers 13.

A commonly used body making machine that is representative of the type having such feed bars and feed fingers is disclosed in U.S. Pat. No. 1,543,460 issued to Nelson Troyer on June 23, 1925. The feed bars and feed fingers may be of the improved type illustrated in U.S. Pat. No. 1,780,049 issued to Mervyn Troyer on Oct. 28, 1930.

Can body blanks 14 of rectangular shape are intermittently moved by the feed bars and feed fingers in the direction of the arrow 15 toward a forming station (not shown). At the forming station the body blanks 14 are formed into tubular shape about a forming mandrel and side-seam forming marginal edge portions of the blanks indicated at 16 and 17 adjacent opposed parallel terminal edges 18 and 19 are overlapped and pressed together into tightly adhering engagement so as to form a lap type sideseam in the formed tubular container body. The adhesion of the side-seam is effected by means of a strip of thermoplastic material 20 applied along the underside of the marginal edge portion 17. Just prior to the forming of the body blank 14 around the forming mandrel, the strip of thermoplastic material is heated to render it tacky so that when it comes into contact with the opposite sideseam forming marginal edge portion 16 and pressure is applied to the lap-seam it acts as an adhesive to bind the lap-seam firmly together is a leak proof manner.

Feed bars 12 are driven in unison cyclically back and forth by means of the body maker drive indicated at 21. The feed fingers 13 advance the blanks 14 from fixed position to fixed position through the body maker 11. As the feed bars retract to the left in FIG. 1 the feed fingers 13 disappear into the feed bars so as to pass beneath the blanks to the rear thereof. The feed fingers then pop up at a point just behind the trailing blank edges, and, when the feed bars begin moving in a forward direction to the right, contact the trailing edges so as to advance all of the blanks to the next forward fixed position in their travel.

As shown in FIG. 1, the three illustrated blanks are in a fully advanced position with the central blank being stationarily positioned at a strip applying station, generally indicated by the numeral 21, of the strip applying apparatus 10. At the strip applying station 21 an adhesive strip 20 is severed from a web of strip forming material 22 and is applied along the side-seam forming marginal blank edge portion 17 in even alignment with the terminal blank edge 19 by means of a combination strip shearing and applying mechanism which is generally indicated by the numeral 23. The marginal edges 16 and 17 of the blanks are disposed in parallel relationship with the feed bars and hence are parallel with the path of travel of the blanks.

The web of strip forming material 22 may be delivered from a roll of the strip forming material indicated at 24. The web of strip forming material is fed between a pair of feed rolls 25 and 26 of a web advancing mechanism generally indicated at 30.

The web advancing mechanism 30 is driven in synchronism with the feed bars 12 from the body maker drive 21 via the drive shaft 31. Positioned on one end of the drive shaft 31 is an eccentrically mounted circular disc 32. Disc 32 is rotatably journalled in a ring journal 33 which has an integral lever arm extending radially outwardly therefrom, indicated at 34. The outer end of the lever arm 34 is pivotably connected to a slide block 35 by means of a pin connection 36.

Slide block 35 is slidably received in a slot 37 near one end of a lever arm 40. The position of the slide block 35 in the slot 37 may be adjusted by means of an adjusting screw 41 which threads through the slide block 35 and has an end thereof rotatably journalled in the lever arm 40 but suitably retained from moving back and forth in the axial direction of the lever arm 40.

The opposite end of the lever arm 40 is connected to a one-way clutch 42 which in turn is attached to the feed roll 26 for rotating the feed roll 26 in only a counterclockwise direction as viewed in FIG. 1.

The web 22 is frictionally engaged between the rolls 25 and 26 so as to be intermittently advanced thereby into the strip shearing and applying mechanism 23. The roll 25 may be freely rotatable to merely back up the feed roll 26 or it may be driven by means of a gear connection (not shown) between the rolls 25 and 26, at the right end thereof, as viewed in FIG. 1, if desired.

As the web 22 is delivered from the feed rolls 25 and 26 it passes into guide means, generally indicated at 43. Guide means 43 may consist of a lower web supporting table such as indicated at 44 and an upper web guide portion 45 superposed above the web 22. The lower web supporting table and upper web guide portion 44 and 45, respectively, define a guide slot therebetween indicated at 46 through which the web 22 will freely pass.

As best seen in FIG. 2, the terminal end of the web of strip forming material 22 is cyclically delivered into the strip shearing and applying mechanism 23 of the strip applying station 21 in a direction normal to the path of the blanks and parallel to the edge 19; the terminal end of the strip forming material being indicated by the numeral 47. The terminal end 47, of the strip forming web 22, when in fully advanced position, as illustrated in FIG. 2, is in lapped juxtaposed relationship with the side-seam forming marginal edge portion 17 of a body blank 14 temporarily stationarily positioned at the strip applying station 21. In delivering the web 22 the side marginal edges of the web will be evenly aligned with the leading and trailing blank edges; the width of the web 22 being substantially as long as the marginal edge 19. With the blank 14 and the terminal end of the web 47 positioned as illustrated in FIG. 2, a vertically reciprocating shearing member 50 is caused to move vertically upwardly by means of a constantly rotating cam 51. As the shearing member 50 rises it cooperates with a stationarily mounted shearing member 52 to shear off the end portion of the web of strip forming material 22 that is in juxtaposition with respect to the marginal edge portion 17 of the blank 14 between cutting edges 48 and 49. The sheared off portion of strip, which is the strip 20 of FIG. 1 will rest on the upper surface 53 of the shearing member 50 as the shearing member 50 continues to move vertically upwardly until the strip 20 is brought into engagement with the undersurface of the marginal edge portion 17 as indicated in phantom outline in FIG. 2. The cutting edges 48 and 49 of the shearing members 50 and 52 and the terminal blank edge 19 lie in a common vertical plane so that the outboard edge of the strip 20 will automatically be aligned with the edge 19 when it is applied.

Since the upper surface 53 of the shearing member 50 is parallel with the plane of the blank 14 it will be apparent that the strip 20 will be applied to the blank in such manner that substantially its entire blank contacting surface will contact the blank at substantially the same instant. Also, since the strip 20 rests on the surface 53, immediately upon its being sheared off, it will be positioned exactly as desired with respect to the blank 14 and will lie flat and wrinkle free so that when it is applied to the blank it will be properly positioned and free of wrinkles.

Since the blank is heated, and since the strip 20 is thermoplastic, it will become tacky when it touches the blank and will adhere thereto in the desired manner. In order to keep the vertically reciprocating shearing member 50 from becoming overheated in operation, it may be necessary, or at least desirable, to provide means for cooling it. One way of accomplishing this is to circulate a cooling fluid through passages therein, such as the passages 54, in a conventional manner.

In order to assure that the strip 20 is applied to the blank 14 with an even desired pressure the upper surface of the blank 14 may be backed up by means of a resiliently mounted back-up bar such as, for example, the back-up bar 55. Back-up bar 55 has a lower flat surface 56 that is parallel with the plane of the blank 14 and is in superposition and coextensive with the marginal blank edge portion 17. The back-up bar 55 is resiliently vertically reciprocatably mounted in a fixedly positioned guide assembly generally indicated at 57 which is a part of the strip shearing and applying mechanism 23. Back-up bar 55 is resiliently biased in a downward direction such as, for example, by means of one or more springs 60. Stop shoulders 61 co-act with the guide 57 so that when the back-up bar is in its lowermost position the lower flat surface 56 thereof will be approximately level with the upper planar blank surface.

In operation, the shearing member 50 in moving vertically upwardly will over-travel slightly so as to lift the back-up bar somewhat against the force exerted by the spring or springs 60 which will apply the desired amount of resilient pressure between the strip 20 and the blank 14.

As seen in FIG. 1, the cam 51, which is mounted for rotation on a shaft 62, is driven via the shaft 62 from the body maker drive 21 in timed relationship with the feed bars 12 and the drive shaft 31 for the eccentric 32. In order to minimize friction between the surface of the cam 51 and the reciprocating shearing member 50, the shearing member 50 is preferably provided with an anti-friction cam roller 63. It will be necessary, of course, to provide means for guiding the vertically reciprocating shearing member 50, but, for the sake of clarity, such conventional guide means have not been illustrated. Also, particularly for high speed operation, it may be necessary or desirable to bias the reciprocating shearing member 50 vertically downwardly by means of springs or other suitable biasing means to insure that the cam roller 63 will follow the cam surface of the cam 51 at all times during the operation of the strip applying apparatus 10. Since such biasing means are conventional, they also have not been illustrated, as it is considered that such illustration of conventional means would tend to obscure rather than promote the understanding of the invention.

As an alternative to resiliently mounting the back-up bar 55, it may be stationarily positioned in the position of FIG. 2 and in order to obtain the desired resilient pressure against the strip 20 when it contacts the blank 14, the cam roller 63 may be vertically resiliently mounted in the shearing member 50, by means of springs or other conventional biasing means.

Since, in the illustrated preferred embodiment of the invention, the adhesive strip 20 is of the thermoplastic type which necessitates heating in order to activate it, the blank marginal edge portions 17 are heated at a heating station 64 which immediately precedes the strip applying station 21. Any suitable heating means may be employed, such as the illustrated electric resistance heaters 65 and 66 respectively positioned above and below the blank marginal edge portion 17 of a blank positioned at the heating station. Resistance heaters 65 and 66 may be energized by any suitable source of electrical energy such as by means of the generators 67 and 70, and suitable controls, not illustrated, may be employed in a conventional manner to control the temperature of the electric resistance heaters 65 and 66.

In lieu of thermoplastic type adhesive strips, it may, in some applications, be possible, or even desirable, to employ adhesive strips of the pressure sensitive type in which the application of pressure alone activates the adhesive with no heat being necessary. In such event, of course, the heating station would not be employed in advance of the strip applying station. The upper surface 53 of the shearing member 50 on which the strip 20 rests during application would advantageously be made very smooth and be chilled so as to prevent the sticking of the strip to the shearing member 50 rather than to the blank 14. The upper surface might also be advantageously coated with a non-stick material such as Teflon.

The web of strip forming material 22 may be made from a number of suitable materials such as, for example, nylon or polyethylene. The particular material used in any instance would depend upon a number of factors such as the required strength of the finished side-seam; the cost of the material; the ease with which the particular material is applied to the blanks as well as other factors peculiar to the particular application.

Container body blanks of rectangular shape have been illustrated, but the blanks need not necessarily be rectangular and may be arcuate in shape such as for containers of frusto-conical configuration. Furthermore, the blanks may be made from a variety of materials such as steel; tin-plated steel; paper or paperboard; aluminum; or paper-metal foil laminates.

Although the apparatus of the invention is described as being associated with a conventional body maker 11 it is within the scope of the invention to provide a complete machine independent of a body maker, operating in accordance with the disclosed principles that would apply the adhesive strip material to body blanks as herein described such that the body blanks would be completely prepared in advance for subsequent delivery to the stack feed magazine of one or more conventional body makers. This arrangement has the advantage that completely prepared blanks can be priorly manufactured during slack periods in the demand for finished containers and can be stored until needed. Also with this system none of the body makers would have to be modified so as to include the apparatus of the invention. Such a machine would incorporate feed bars such as the feed bars 12 having blank advancing feed fingers such as the fingers 13 or equivalent blank advancing means.

Since other modifications of and means for employing the invention will become apparent to those skilled in the art, the invention is not intended to be limited in scope to the details of the illustrated embodiment but only as set forth in the appended claims.

OPERATION

Body blanks 14 are delivered to the usual feed hopper of the body making machine 11 and are delivered from the feed hopper one-at-a-time by means of the feed bars 12 and feed fingers 13 in a horizontal direction toward the forming station. The individual body blank is first advanced to the heating station 64 at which it remains stationarily positioned while the feed bars 12 retract to pick up and advance the next succeeding blank. While at the heating station, the marginal edge portion 17 is heated to a desired temperature by means of the electric resistance heaters 65 and 66. Next the body blank is advanced by the feed bars and feed fingers into the strip applying station 21 where it again remains stationary during the retraction of the feed bars 12. When in proper position at the strip applying station, the leading and trailing blank edges will be evenly aligned with respect to the side marginal edges of the web of strip forming material 22.

As the blank is advancing into the strip applying station, the terminal end of the strip forming web is advanced the predetermined amount into the strip shearing and applying mechanism 23 by the web advancing mechanism 30. The width of the sheared strip 20 may be varied as desired within the range of adjustment afforded by the adjusting screw 41 which is effective to change the effective length of the lever arm 40. This changes the angle through which the lever arm 40 is caused to move by the eccentric disc 32 which in turn determines the amount of rotation of the feed roll 26 which is advanced by the swinging movement of the lever arm 40 via the one-way clutch 42.

After the web 22 has been advanced the desired amount for the selected width of the strip 20, the cam 51 acts to raise the vertically reciprocating shearing member 50 to sever a strip 20 from the end of the web 22 that is in lapped juxtaposition with the blank 14. The shearing action is effected by cutting edges 48 and 49 of the shearing member 50 and the stationarily mounted shearing member 52 as best seen in FIG. 2. Upon shearing of the end portion of the web 22, the sheared strip 20 will rest on the upper horizontally disposed flat surface 53 of the shearing member 50 in a wrinkle free condition and in substantially exact alignment with the side-seam forming marginal edge of the blank indicated at 19. Cam 51 continues to lift the shearing member 50 until the upper surface of the strip 20 engages the under surface of the blank along the marginal edge portion 17. In order to insure that the strip 20 is applied with the desired amount of pressure to the blank 14, the shearing member 50 under the action of the cam 51 is caused to continue moving vertically upward a slight amount so as to cause the back-up bar 55 to be lifted slightly which in turn causes the spring or springs 60 to be compressed somewhat. The compression of the spring or springs assure that the desired degree of pressure between the strip 20 and body blank 14 is applied for proper adherence of the thermoplastic strip to the pre-heated marginal edge portion 17.

Since, during high speed operation, the upper surface 53 of the reciprocating shearing member 50 will come into close proximity with the heated blank at a high rate of frequency, in order to maintain this surface at a desired low temperature a suitable cooling fluid is circulated in the passages 54 in the reciprocating shearing member 50.

Upon the application of the strip 20 to the blank 14, the reciprocating shearing member 50 is caused to be lowered by further rotation of the cam 51 until it assumes its fully lowered position as depicted in FIG. 2. As it lowers, the feed bars 12 advance the blank 14 out of the strip applying station 21 to the next advanced position on the feed bars. At the same time a new blank 14 is advanced from the heating station 64 into the strip applying station 21 and the strip 20 applied thereto in the manner just described.

Upon the retraction of the vertically reciprocating shearing member 50 the web 22 is again fed into the strip shearing and applying mechanism 23 in the described manner by the web advancing mechanism 30 ready for the next shearing and strip application operation.

I claim:
1. A method of applying strip material along a marginal edge portion of blanks comprising: moving blanks one at a time along a path toward a strip applying station; moving a terminal end of a web of strip forming material into said station to position a portion of the web adjacent the terminal end thereof into lapped juxtaposition with a marginal edge portion of a blank at said station; entirely shearing off said lapped juxtaposed web portion and pressing the sheared off strip into adhering engagement with the blank at said station along said marginal edge.

2. A method as set forth in claim 1 including the additional step of heating the blanks along said marginal edge portion before advancing the blanks into said station.

3. A method as set forth in claim 2 further characterized in that the blanks and web are moved with intermittent motion toward said station.

4. A method as set forth in claim 3 further characterized in that the path of movement of the blanks is a straight line and the path of movement of the web is substantially normal to the path of movement of the blanks.

5. A method as set forth in claim 4 further characterized in that the path of movement of the blanks is horizontal and the blanks are disposed in a horizontal plane.

6. A method as set forth in claim 5 further characterized in that the terminal end of the web is moved into said station in such a manner that the portion of the web adjacent thereto is in lapped juxtaposition with respect to the bottom surface of said blank marginal edge portion of said blank at said station.

7. A method as set forth in claim 6 further characterized in that the web is sheared by an upward motion of a shearing member; the sheared off strip remains on a flat upper surface of the shearing member that is parallel to the plane of the blank, and, all portions of the blank engaging surface of the sheared off strip are substantially simultaneously pressed into adhering engagement with the overlying blank by further upward movement of the shearing member.

8. A method as set forth in claim 1 further characterized in that the blanks and web are moved with intermittent motion toward said station.

9. A method as set forth in claim 8 further characterized in that the path of movement of the blanks is a straight line and the path of movement of the web is substantially normal to the path of movement of the blanks.

10. A method as set forth in claim 9 further characterized in that the path of movement of the blanks is horizontal and the blanks are disposed in a horizontal plane.

11. A method as set forth in claim 10 further characterized in that the terminal end of the web is moved into the station in such manner that the portion of the web adjacent thereto is in lapped juxtaposition with respect to the bottom surface of said blank marginal edge portion of said blank at said station 12. A method as set forth in claim 11 further characterized in that the web is sheared by an upward motion of a shearing member; the sheared off strip remains on a flap upper surface of the shearing member that is parallel to the plane of the blank, and, all portions of the blank engaging surface of the sheared off strip are substantially simultaneously pressed into adhering engagement with the overlying blank by further upward movement of the shearing member.

13. A method of applying a strip of thermoplastic material along an edge portion adjacent a terminal edge of container body blanks comprising the steps of: moving a plurality of blanks in single file order step by step along a predetermined horizontal straight line path toward a strip applying station with the blanks lying in a horizontal plane and with the terminal edge of the blanks to have the strip material applied adjacent thereto being disposed parallel to said path; heating said edge portion of each blank at a place along said path; moving the heated blanks along said path one at a time into said strip applying station; intermittently advancing a terminal end of thermoplastic strip forming material of a width substantially as long as said blank terminal edge in time with the advancing blanks into said strip applying station in a direction normal to the path of the blanks, with the strip forming material adjacent said terminal edge thereof, when in a fully advanced position, underlying a predetermined width of an advanced blank temporarily stationarily positioned at said strip applying station and being in a plane parallel to and slightly below the blank, with said terminal edge of the strip forming material being parallel to said terminal edge of the blank; shearing off the portion of strip forming material underlying the blank; horizontally supporting the severed strip; lifting and resiliently substantially simultaneously pressing all portions of the blank engaging surface of the severed strip into adhering engagement with the heated blank along the entire length of said blank terminal edge and then advancing the blank having the strip applied thereto along said blank path out of the strip applying station while advancing the next succeeding blank into the strip applying station and advancing the new terminal end of strip forming material into the strip applying station to repeat the cycle.

References Cited
UNITED STATES PATENTS 2,103,120    12/1937    Sabo et al. _____ 83—568 X
2,399,616    5/1946    Bailey _____ 156—354

BENJAMIN A. BORCHELT, Primary Examiner

W. T. RIFKIN, Assistant Examiner

U.S. Cl. X.R.

83—568; 156—264, 297, 355